Aug. 13, 1940.  R. W. KING  2,211,469
RAILWAY ROLLING STOCK
Filed Dec. 2, 1937
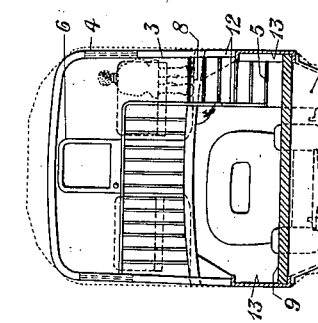
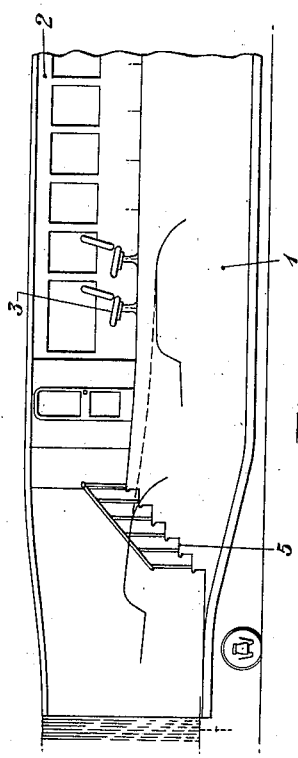
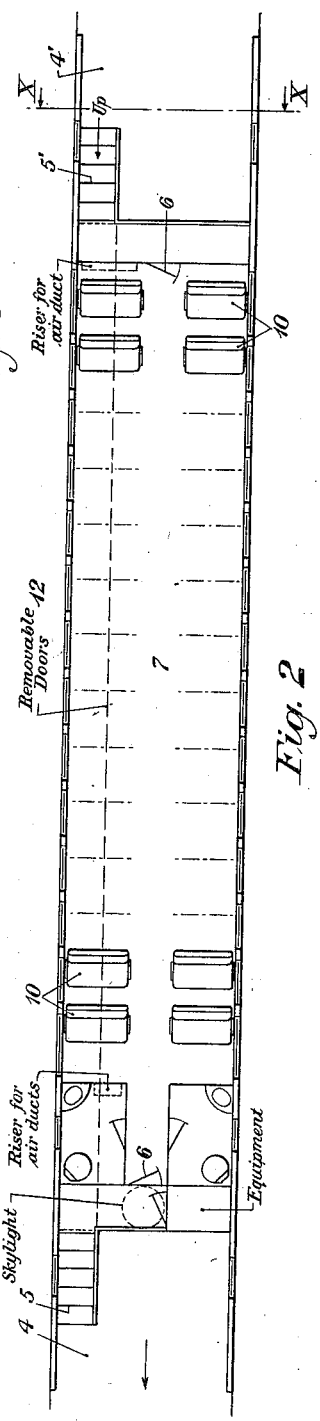
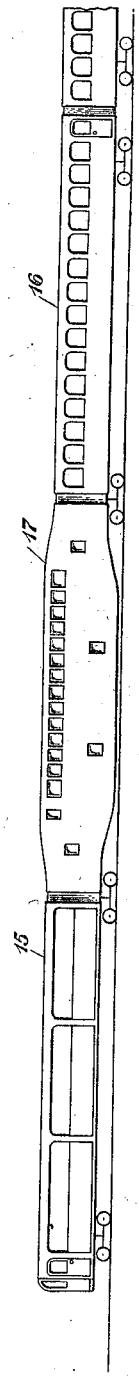
INVENTOR Patented Aug. 13, 1940

2,211,469

UNITED STATES PATENT OFFICE 2,211,469

RAILWAY ROLLING STOCK

Robert Waldo King, Short Hills, N. J.

Application December 2, 1937, Serial No. 177,678

8 Claims. (Cl. 105—340)

This invention relates to a system for transporting motor vehicles and their passengers by railroad trains, and particularly to novel types of railroad cars, characterized by means to facilitate the loading and the unloading of the said vehicles and their passengers, and to provide suitable protection to the said vehicles and passengers in transit.

In the U. S. Patent No. 2,088,655, granted to me on August 3, 1937, there are described various types of special railroad cars designed to transport motor vehicles and their passengers and so arranged that the said vehicles may be readily loaded upon the said cars or unloaded therefrom. In the types of car shown in the said patent, the passengers may remain seated in their motor vehicles during the journey by train; or they may leave their motor vehicles and walk through the train, while this is in motion, until reaching some coach, diner or other standard type of car provided for their accommodation.

It is desirable, however, to provide the comfort of air-conditioning (air filtering and cooling) together with certain lounge, restaurant and even sleeping accommodations at a minimum cost and without loss of the rapid loading and unloading possibilities inherent in a train possessing a continuous vehicular runway as disclosed in my U. S. Patent No. 2,088,655. The present invention renders unnecessary the hauling of cars which are exclusively coaches, diners or sleepers, by combining with the motor-carrying cars any or all of these other needed or desirable accommodations.

The manner in which that is accomplished will be readily understood from the following description when read in connection with the attached drawing, of which Fig. 1 shows in fragmentary form a longitudinal cross-section of one end of a car embodying this invention; Fig. 2 is a plan view of the said car; Fig. 3 is a sectional view along the line $xx$ of Fig. 2 and looking toward the interior; and Fig. 4 represents the combination of a car, embodying the present invention, with two cars of types shown in my U. S. Patent No. 2,088,655, forming a transportation unit by which the full economies of my several inventions may be effected.

As will be seen from Fig. 1, the car embodying the present invention comprises a runway 1 through which the vehicles pass during loading and unloading and where they will be stored during transportation. Above such runway or passageway is the passenger compartment 2 having therein the seats 3 arranged on each side of the aisle 7 that extends through the said compartment. This compartment is reached by a flight of narrow stairs at or near each end of the car, as shown by 5 and 5'. At the upper end of each flight of stairs is a landing from which the passengers may pass into the compartment 2 through the doors 6 and 6' which effectively seal the compartment against the outside air and render practicable the air-conditioning of the compartment. The side walls of the car are provided with windows, certain of which are suitably spaced to provide adequate lighting for the passenger compartment and others to afford proper lighting of the vehicle runway.

In order to provide comfortable head room for the passengers when occupying the upper deck, the lower deck comprising largely the runway for automobiles is dropped throughout the central portion of the car well below the floor level ordinarily employed in railway cars. As shown in the plan, Fig. 3, the runway lies slightly to one side, thus leaving space along the other side for the walks 4 and 4' that lead up to steps 5 and 5'. The practicability of the double-decked design can be noted by reference to the dotted outline in Fig. 3, for this represents the standard American limits in car dimensioning.

Reference should be made to the girder members 13 which comprise a portion of each side of the car. Because of the centrally depressed floor it is not convenient to provide a straight and rigid member extending lengthwise of the car from buffer to buffer, and special construction is called for to impart the required buffing strength. In the design illustrated in the accompanying drawing, particularly in Fig. 3, this is provided by the girders 13, which are stiffened laterally by their flanged edges, and which naturally receive additional lateral stiffening by the presence of the floors of the vehicle runway and the passenger compartment. It will be understood that the girders 13 are rigidly and strongly associated with bolsters over each truck and also with end sills.

Underneath the steps and extending along the side of the car, as indicated by the dotted line, there is ample unoccupied space 11 which may be assigned to air-conditioning equipment, a storage battery for car lighting, water tank, and, if the car is to constitute a complete unit in itself, by such air-brake equipment as may normally be suspended from the car floor. This space may be reached either from below or from doors or removable panels 12 in the car walls, as indicated in Figs. 2 and 3.

It is not necessary, however, that each car as above described be regarded as a separate and complete unit. Since the passengers occupy considerably less space than their motor-cars, one railway car, when equipped in the above manner with an upper deck and seats, can readily accommodate as many persons as would on the average be derived from twelve to sixteen or even more automobiles. The length of train required by these automobiles divides conveniently into three or four (or perhaps five) car lengths. Therefore, to each car equipped for passengers may be associated two or more vehicle cars of one or other of the types disclosed in U. S. Patent No. 2,088,655. One manner of association is shown in Fig. 4, in which the combined passenger and vehicle-carrying car 17 is in the center of a group of three and is mounted upon trucks, each of which is common to the adjacent vehicle car. The cars designated 15 and 16, and which adjoin car 17 on the left and right respectively, may obviously be of any of the types described in said patent, or may differ therefrom in that fewer windows are provided, since car 17 provides observation facilities for the passengers.

As shown in Fig. 3, there is ample space to install air-circulating ducts such as are usually employed in conjunction with an air-conditioning installation. It is contemplated that these ducts would communicate with both ends of the passenger compartment, making possible the simultaneous supply of warmed or cooled fresh air and the withdrawal of old air.

While the car detailed in Figs. 1, 2 and 3 has been shown as providing coach-like seating accommodations upon its upper deck, it is apparent that this space might be otherwise employed should experience dictate. Thus the upper deck might be equipped for diner or buffet service by the provision of a kitchen, tables and chairs or stools, after one of the fashions standard in railroad practice. Or the upper deck might be equipped with seats convertible into beds or berths and with cupboards for the adequate storage of bedding. Or again, the upper deck might comprise a simple runway for more vehicles, and accessible to them, under their own power, by a sort of drawbridge or gang-plank at either end. This drawbridge would, of course, be so disposed that it could be swung up to give clear access to the lower deck. It is considered that means for accomplishing these and other ends are sufficiently apparent as not to require detailed drawings.

Trains composed of auto carriers of the types disclosed in U. S. Patent No. 2,088,655 may, of course, be supplemented by the standard type of coaches, dining cars and sleepers, but the alternative above suggested will have certain applications since cars possessing the double-decking can be placed anywhere in an auto carrier train without interfering with the continuity of the vehicular runway. There are numerous reasons for believing that a runway extending virtually unbroken from end to end of the train will be found advantageous. These considerations all hinge upon the fundamental requirement of rapid loading and unloading of vehicles. The service herein contemplated, to be economically satisfactory both to the railroads and to the motoring public, must be capable of handling large numbers of automobiles upon a single train. Perhaps fifty automobiles would comprise a sort of lower limit, although obviously the determination of such a limit must depend upon many factors to which definite values cannot at the moment be assigned. On the other hand, it is believed that between 100 and 150 motor-cars might represent the average load for a train. Allowing an average length of 18 feet per motor-car, the length of the train may therefore be as much as one-half or even two-thirds of a mile. Hence, it will be appreciated that to load or unload such a train in ten to fifteen minutes will require continuous movement of the line of automobiles at some such rate as five to six miles per hour. This can be much more readily accomplished on the basis of a continuous runway than in any other way.

It is believed that by means of a combination of cars, such, for example, as that suggested by Fig. 4, it will be practicable to furnish a new service that will not only be economically sound and attractive to the traveling public, but will also afford to such travelers essentially the same comfort as they are now accorded upon the standard passenger trains of the country. It is further believed that the furnishing of such service will enable the railroads to regain a substantial part of the passenger traffic that they have lost to the highways.

In the foregoing description of this invention, all details that are now standard in railroad practice have for obvious reasons been omitted and only those features shown that are necessary for an understanding of the invention.

While the invention has been shown in a particular form and arrangement of parts it is to be understood that it is capable of embodiment in other and different forms without departing from the spirit and scope of the appended claims.

What is claimed is:

1. A railroad car for the transportation of motor vehicles and their passengers having a compartment within the said car for the accommodation of the said passengers, the floor of the said compartment being at such elevation above a depressed part of the floor of the car positioned between the trucks thereof as to permit the passage of a motor vehicle through the space in said car between the floor thereof and the floor of the said compartment.

2. A railroad car for the transportation of motor vehicles and their pasengers having a floor, side walls and a roof, a passenger compartment positioned within the said car between said roof and floor and at such distance above a depressed part of the said floor positioned between the trucks thereof as to permit the passage of a motor vehicle between said floor and the lower level of said compartment.

3. A railroad car of the type defined by claim 2 characterized by flexible weatherproof joints at one end or both ends thereof to coact with similar joints upon adjacent cars and means to provide a continuous runway between cars for the said vehicles and passengers.

4. A railroad car for the transportation of motor vehicles and their passengers, the said car having a floor, side walls and a roof, the mid portion of the floor of said car, longitudinally considered, being depressed below the level of said floor at or near the ends of the said car, and a passenger compartment positioned within the said car and in the upper part thereof, the said compartment being substantially coextensive with the depressed portion of said floor but separated therefrom by a distance sufficient to permit the passage of a motor vehicle.

5. A railroad car of the type defined by claim 4 characterized by flexible weatherproof joints at one end or both ends thereof to coact with similar joints upon adjacent cars and means to provide a continuous runway between cars for the said vehicles and passengers.

6. For the transportation of motor vehicles and their passengers, a railway car consisting of two longitudinal compartments, one above the other, the car wheels being so dimensioned that the floor of the upper compartment can be sufficiently elevated above the car deck that there is adequate headroom for either passengers or automobiles throughout each compartment from end to end of the car without the cross-sectional dimensions of the car exceeding the customary clearance limits.

7. For the transportation of motor vehicles and their passengers, a railway car consisting of two longitudinal compartments, one above the other, the car wheels being so dimensioned that the floor of the upper compartment can be sufficiently elevated above the car deck that there is adequate headroom for either passengers or automobiles throughout each compartment from end to end of the car without the cross-sectional dimensions of the car exceeding the customary clearance limits and the car ends being so designed that when several cars are joined to form a train, the vehicles both above and below can be loaded and unloaded by driving them from end to end of the train.

8. A railway car for the transportation of motor vehicles and their passengers, the car consisting of two longitudinal compartments, one above the other, the car ends being characterized by practically full width end openings and flexible weatherproof housing at each end together with yielding buffer plates so that if two or more cars are joined together to form a train, there are formed upper and lower runways continuous and protected against the weather, the car wheels being so dimensioned that the floor of the upper compartment can be sufficiently elevated above the car deck that there is adequate headroom for either passengers or automobiles throughout each compartment from end to end of the car and train without the cross-sectional dimensions of the car exceeding the customary clearance limits.

ROBERT W. KING.